Nov. 15, 1966 H. FRANKE ET AL 3,286,244

METHOD AND APPARATUS FOR THE STORING AND REPRODUCTION OF DIGITAL SIGNALS UTILIZING CIRCUMFERENTIAL DISPLACEMENT

Filed Oct. 2, 1962 4 Sheets-Sheet 1

United States Patent Office 3,286,244
Patented Nov. 15, 1966

3,286,244
METHOD AND APPARATUS FOR THE STORING AND REPRODUCTION OF DIGITAL SIGNALS UTILIZING CIRCUMFERENTIAL DISPLACEMENT

Heinz Franke, Heidenheim (Brenz), Wurttemberg, and Alois Hammer, Aalen-Unterrombach, Wurttemberg, Germany, assignors to Carl Zeiss-Stiftung, Wurttemberg, Germany, a corporation of Germany
Filed Oct. 2, 1962, Ser. No. 227,887
Claims priority, application Germany, Oct. 3, 1961, Z 8,999
11 Claims. (Cl. 340—174.1)

This invention relates to a method and means for recording information and, more particularly, relates to an improved method and means for recording information in the form of signal amplitude so that it can be read out nondestructively and in random fashion.

In many applications, it is desirable to store information and to retrieve or read out the stored information at a subsequent time and in random fashion. By random readout, it is meant the specific information can be located without the necessity for searching the entire stored information. It is preferable that the method and means for such storage be suitable for repeated nondestructive readout of the information and yet be adaptable so as to enable easy erasure of the information and replacement of any bit of information with new information.

For example, it is often necessary to store a plurality of correction signals related to a measured function and subsequently to readout the specific correction for any specific value of the function so that the correction may be automatically applied to the measurement.

Thus, it is known to the art equipment which stores the correction signal in the form of a curve drawn on a chart and which uses a photoelectric scanner for information readout. However, such equipment requires different read-in and read-out sensors and are relatively expensive. Further, it is difficult to replace the stored information with new values as they are determined.

It is, therefore, the primary object of this invention to provide an improved method and means for information storage in which a single sensor is used for both storage and information readout.

It is a further object of this invention to provide an improved method and means for information storage in which the information is stored on a rotating magnetic drum by a recording head and in which the angular position between the position of said recording head and a reference point on the rotating drum is adjusted to be responsive to the amplitude of the information signal during storage and in which this angular position is determined by comparison of the stored signal with a reference signal synchronously generated with said reference point on the drum for readout.

In accordance with the method of this invention, a reference point is located on a rotating magnetic storage cylinder or drum. A timing signal keyed to this reference point is generated synchronously related to passage of the reference point on the drum past a measurement location. A magnetic head is provided to record on the drum a signal applied thereto. To store information (in the form of signal amplitude), the angular position between the head and the reference point on the drum is adjusted in response to the amplitude of the information signal. The timing signal is then applied to the head and stored on the drum. The positioning of the relative motion between head and reference point may preferably be controlled by a servo system. The stored information then occupies a band along the drum axis. Other information may be stored on adjacent bands. To readout the signal, the recording head picks up the stored signal to give an electrical signal on each rotation of the drum. Thus, the head is used as a reference signal generator. The reference signal is compared in time with the timing signal and the relative displacement of the head from the reference point for the specific band on the drum is adjusted until the reference and timing signals are synchronized. The angular position between head and reference is the measure of the amplitude of the stored signal.

Since the relative angular position between the reference point and the position of said recording head is the measure of the amplitude of the information signal, it is possible to move the head with respect to a fixed reference point or to move the reference point with respect to a fixed head to obtain the desired results.

Thus, for example, the timing signal may be a signal of predetermined wave form such as a square wave with starting point of each cycle being synchronously related or keyed to a specific reference point on the magnetic drum. The recording head would then be circumferentially displaced about the revolving magnetic drum and when the circumferential displacement is proportional to the amplitude of the information signal, the timing signal may be applied to the head to establish a reference signal stored on the drum. For this purpose, it is convenient to utilize a servo which rotatably drives the head proportional to the amplitude of the information signal as, for example, a null balancing servo system. On readout, the stored reference signal is read by the magnetic head, which signal is compared with the timing signal. Relative phase displacement between the two signals can be used to generate a comparison signal to drive the recording head until the comparison signal disappears. At this point, the recording head has the same angular position with respect to said reference point as occupied upon recording and this angular position is a measure of the amplitude of the stored information signal.

Alternatively, the timing signal may be generated so that the frequency thereof is synchronously related to drum rotation, but the initiation of each cycle in the wave form is adjustably positioned with respect to the drum. A fixed magnetic head is positioned in recording relationship to the revolving drum. In this application, the angular position of the reference point on the drum is changed according to the amplitude of the signal to be recorded. The angular position between said reference point and said recording head is the measure of the amplitude of the stored signal.

The apparatus, in accordance with a preferred embodiment of this invention, contains a rotating drum having a magnetizable surface. A magnetic head is positioned in recording relationship to the drum and is rotatably mounted for movement about the drum on an axis coincident with the axis of rotation of the drum. A servo drive is provided to rotate the head about the drum so as to provide a circumferential displacement of the head from a reference location on the drum proportional to the amplitude of the information signal to be stored. A timing signal having a predetermined wave form is generated synchronously with drum rotation and is provided with a cyclic pattern having predetermined phase relationship to the reference point on the drum. When the recording head has been properly positioned, a timing signal is used to energize the head, thereby to store a reference signal on the drum. For readout, the head generates a signal in accordance with the passage of the reference signal thereunder, which signal is compared with the timing signal. Any phase error between the two signals is utilized to generate a comparison signal which will drive the servo motor so as to null out the comparison signal. Thus, when the comparison signal is nulled, the magnetic head will have the same angular position with respect to the reference point on the drum as existed during storage and this angular distance can be used as the readout of the amplitude of the information signal stored. The servo positioning is, of course, a convenient means for measure of this relative rotation.

Alternatively, the head could be fixed in position and the timing signal varied so as to provide a selectable position of the reference point on the rotating drum. In this event of course, the reference point is moved with respect to the position of the stored information signal, but the relative distance therebetween is utilized as the indication of the amplitude of the information signal stored.

In order to provide means for storing a plurality of signals as, for example, a plurality of correction signals to a measured function, the magnetic head is so positioned as to be movable axially along the drum in accordance with the amplitude of the function to store the correction for each specific signal amplitude. Similarly, on readout, the function amplitude can be used for axial positioning of the head. In this manner, the correction signals for any specific value of the function can be derived for correction of the function.

The timing signal is preferably generated by means of a generator which produces rectangular voltage pulses the frequency of which is synchronously related to drum rotation. The starting point of each pulse is used as said reference point on the drum. When this starting point is fixedly positioned with respect to the drum said reference point is fixed. In this case upon each rotation of the drum a pulse is released the starting point of which corresponds to a certain angular position of the drum. When the starting point is adjustably positioned with respect to the drum said reference point can be moved with respect to a fixed magnetic head according to the amplitude of the signal to be stored.

A high frequency signal is recorded on a band at one end of the drum and there is provided a recording head associated to said band for generating an electrical signal upon drum rotation. This electrical signal is modulated by said rectangular voltage pulses generated by the timing signal generator. The modulated signal is then stored on said magnetic drum.

Also it is often desirable to provide a plurality of magnetic heads so that information may be selectably read out by any one of the heads, thereby to shorten traverse time.

Having briefly described this invention, it will be more fully described in the following portions of the specification, which may best be understood by reference to the accompanying drawings, of which:

Figure 8:
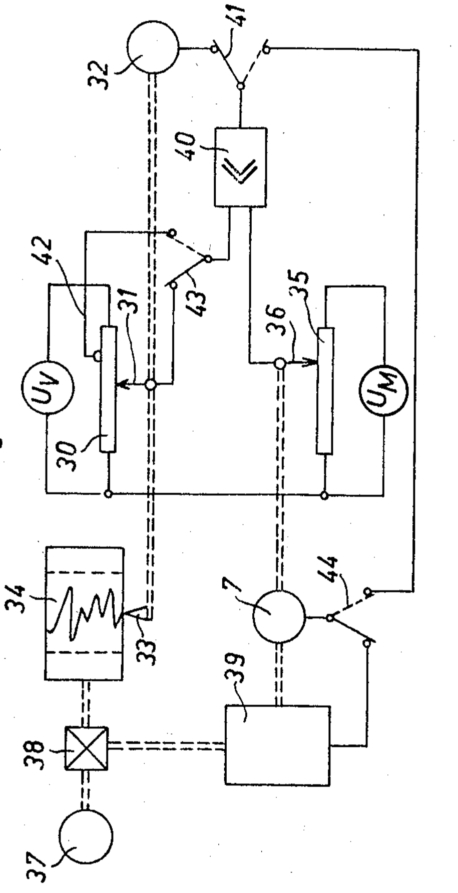
Figure 4A:
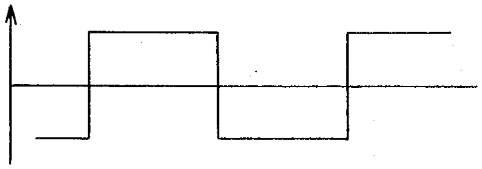
Figure 4B:
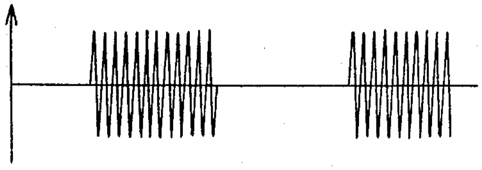
Figure 4C:
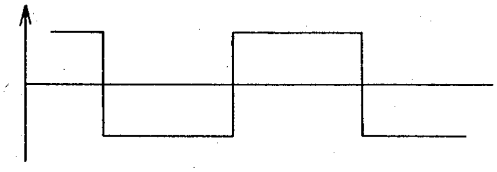
Figure 6:
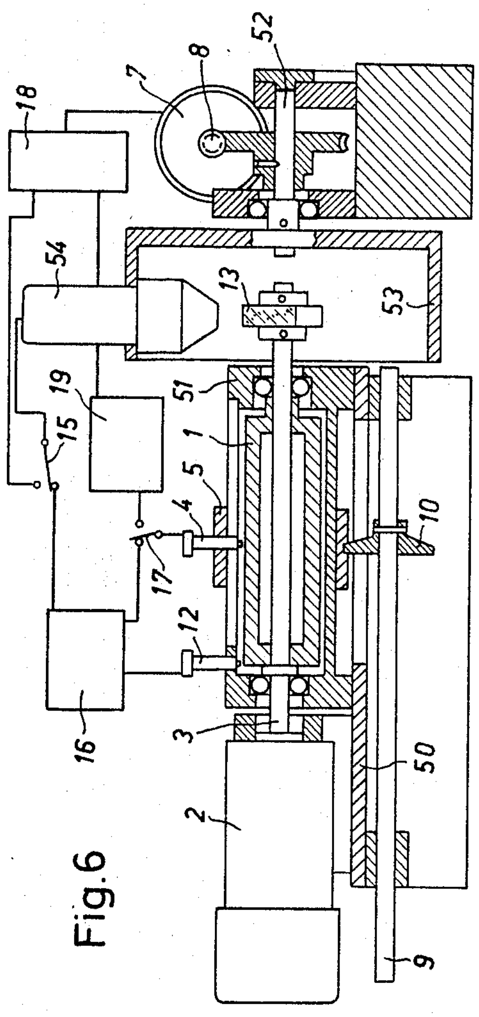

FIGS. *4a–4c* show the voltages supplied by the timing signal generator and by the magnetic head;

FIGS. *5a–5d* show the voltages supplied by the timing signal generator and the magnetic head upon the reproduction of a measured value;

FIG. 6 is a partially sectioned view of another embodiment of the invention;

FIGS. *7a–7c* show the voltages supplied by the square wave generator and by the magnetic head of the device shown in FIG. 6;

FIG. 8 shows an arrangement for measuring the optical transmission of a sample which is built up with the use of the new device.

Figures 1, 2:
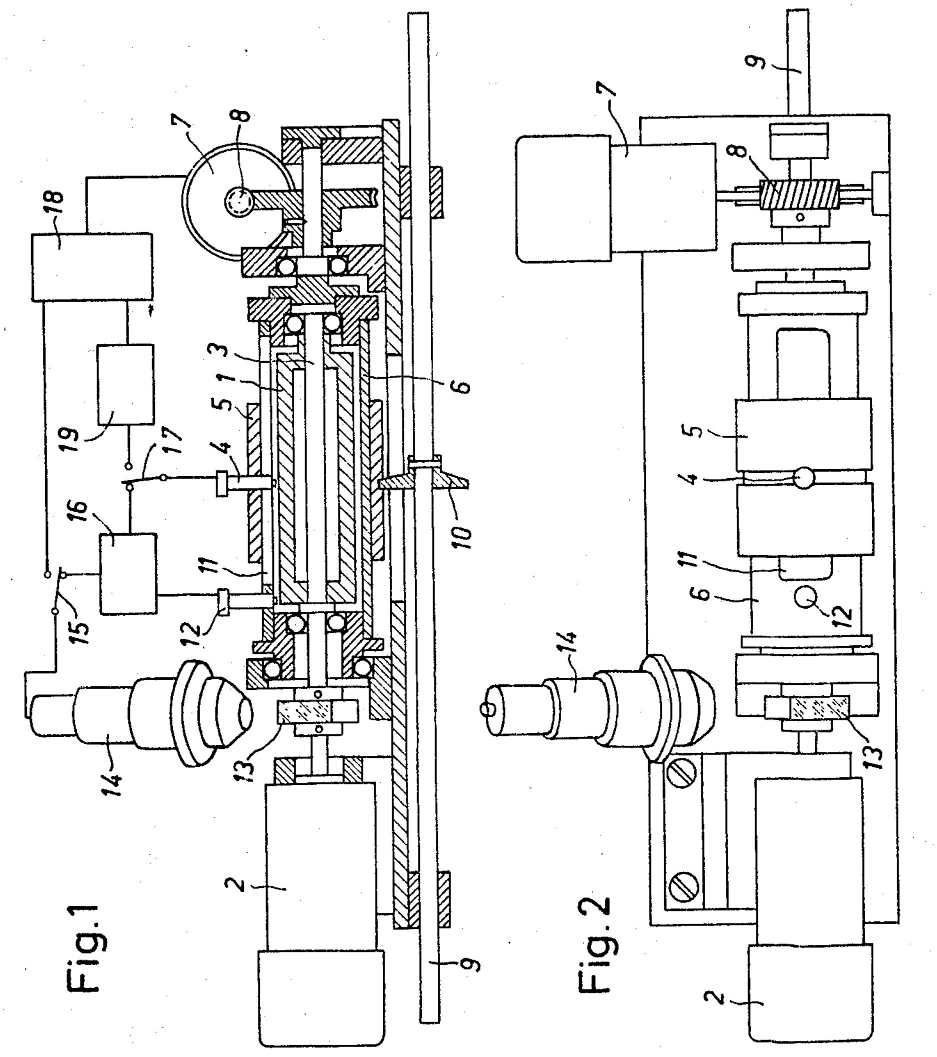
FIG. 1 is a partially sectioned view of one embodiment of the present invention.
FIG. 2 is a top view of the apparatus shown in FIG. 1.

In FIGS. 1 and 2, there is shown a drum 1 coated with a magnetizable recording surface, which drum is mounted on shaft 3 and rotated by an electric motor 2. The motor may, for example, drive the drum at a rotational rate of 3000 r.p.m. At a slight distance from the drum 1, there is arranged a magnetic head which is supported in a cylinder 5 which is coaxial to drum 1. The cylinder 5 is slidably mounted on cylinder 6 which may be rotated relative to the magnetic drum by means of the servo motor 7 and the worm and pinion drive 8. As cylinder 6 turns the cylinder 5 and thus, the magnetic head 4 are carried along. Cylinder 5 and, thus, the magnetic head 4 can be moved axially over the drum by a push rod 9 and a coupling driver 10. To provide clearance for the movement of the magnetic head in the axial direction, an axial slot 11 is provided in the wall of cylinder 6.

To generate a reference signal, there is provided a magnetic head 12 which is fixed axially with respect to the drum. A high frequency signal, as for example, a 10 kc. signal is recorded on the drum along a band scanned by the head 12. To establish a reference point on the drum periphery and to generate an electrical signal synchronously related to the reference point, there is provided a disk 13 mounted on the shaft of motor 2. The disk is blackened over half of the peripheral surface thereof, and a photoelectric sensor 14 is placed in scanning relationship to the disk periphery. Thus, with rotation of the disk, a photoelectric sensor will generate a square wave, the frequency of which is related to drum rotation rate and the phase of which is related to the reference point on the drum.

The manner of operation of the apparatus shown in FIGS. 1 and 2 is as follows:

An information signal voltage, the amplitude of which is proportional to the measured quantity to be stored is fed to the servo motor 7. The servo motor will rotate accordingly, as, for example, in a null balancing arrangement known in the art, and as the servo motor 7 rotates, the magnetic head 4 is rotated about the drum through the worm and pinion drive. To provide a timing signal having a direct relationship to the reference point on the drum, the square wave output of the photoelectric sensor 14 is applied through the switch 15 to modulator 16 to which the high frequency alternating voltage from head 12 is also applied. In the modulator 16, the high frequency voltage is 100% modulated by the square wave to provide a square wave output as illustrated in FIG. *4b*. If the switch 17 is now closed as shown in FIG. 1, the magnetic head 4 will record the reference signal carrier on the rotating drum. Since the modulation is derived from one-half of the drum circumference, the stored reference signal will similarly occupy one-half of the circumference of the drum.

Thus, the information signal amplitude is stored in the form of the relative distance between a reference point on the drum and the reference signal stored thereon. To read out the reference signal, switches 15 and 17 are reversed in polarity.

Thus, the timing signal generated by the sensor 14 is applied directly to a mixer 18. The reference voltage readout by head 4 is demodulated by the demodulator 19 and also applied to the mixer 18. The demodulated signal is shown in FIG. *4c*.

The mixer will, when the voltage applied to it have the same relative phase as is shown in FIGS. *4a* and *4c*, generate no output voltage. Thus, the head 4 corresponds to the same relative circumferential displacement from the reference position on readout as it did during recording. The relatively circumferential displacement can be utilized to provide a readout signal as, for example, by gearing a potentiometer to the servo motor shaft.

In practice, it is usual to record a plurality of information signals at various positions along the axial length of the drum. Thus, for example, the position rod 9 will move the head 4 sequentially to adjacent positions over the entire length of the drum and at each position, the desired information will be stored on the drum.

Figure 5A:
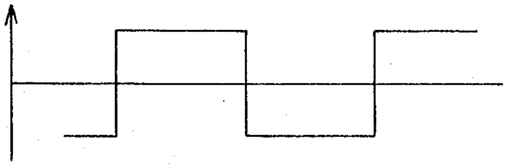
Figure 5B:
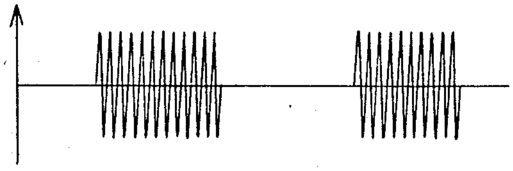
Figure 5C:
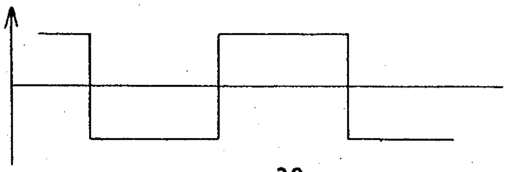
Figure 5D:
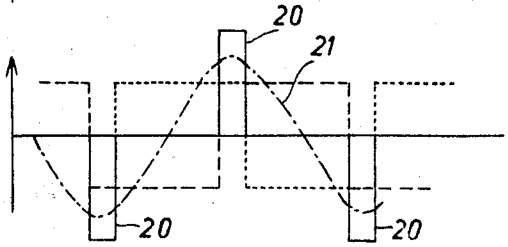

When it is desired to readout the information stored for each function position, the push rod is driven to that position. The magnetic head 4 will then readout a square wave as illustrated in FIG. 5*a*, which is generated by passage of the reference signal stored at that position under the readout head. A typical signal is illustrated in FIG. 5*b*, which after demodulation, takes the form shown in FIG. 5*c*. Mixing of the signal of 5*c* with the square wave generated by the photoelectric sensor plotted in FIG. 5*a* will create difference pulses 20 as shown in FIG. 5*b*. The pulse repetition rate of the difference pulses is the same as the square wave from the sensor with the relative phase being zero or 180° dependent upon the direction of deviation of the head 9 from its proper position. Filtering with a low pass filter will generate a cyclic wave 21, the amplitude of which is proportional to the pulse width (and, thus, the misalignment between actual and desired head positions) and the phase of which is related to the direction of the misalignment. This wave can be utilized as an error signal to drive the servo motor to a position to null out the error signal, and thus, to position the magnetic head 4 properly with respect to the reference point on the rotating drum.

Thus, on readout, the magnetic head can be repositioned at exactly the same relative circumferential position as the head upon recording, and in this maner, reproduces the stored information. As mentioned previously, an electrical signal responsive to the circumferential distance may be obtained by a potentiometer coupled to the servo drive.

Figure 3:
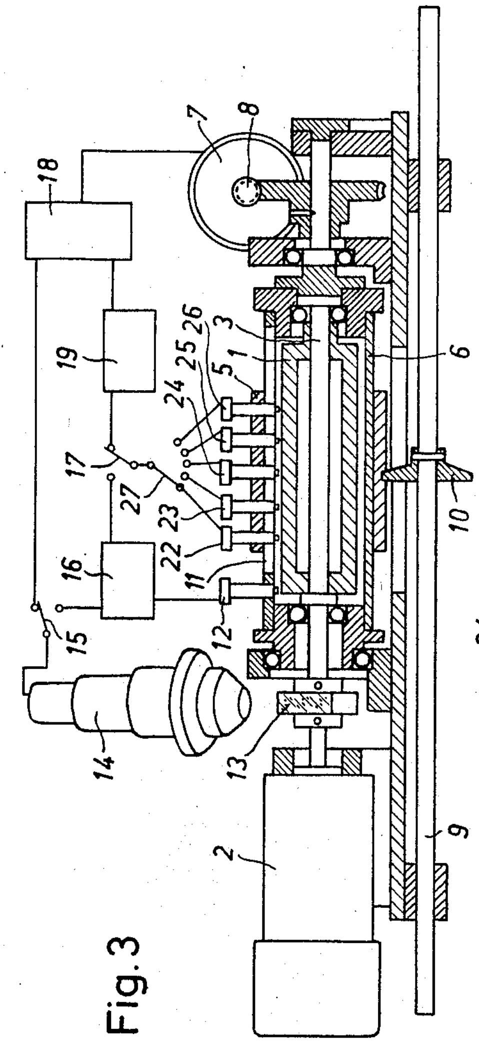
FIG. 3 is a partially sectioned view of another embodiment of the invention.

In the case of the embodiment of the device in accordance with the invention shown in FIG. 3, the cylinder 5 bears a plurality of magnetic heads 22 to 26. Each of these magnetic heads can be selected by means of the switch 27. With this device, it is possible to store several different measured values and to extract separately the individual values stored. Each of the magnetic heads 22 to 26 carries out the same function as the magnetic head 4 of FIG. 1.

In the case of the device shown in FIG. 3, it is advantageous to develop the switch 27 as an electronic switch. By means of such an electronic switch, a specific magnetic head can be selected very rapidly from a large number of magnetic heads both for the recording and for the reproduction.

Instead of the disks 13 and the photoelectric pickup device 14 shown in FIGS. 1 to 3, there can also be provided, for example, a magnetic disk and a magnetic head or a mechanical device. All of these devices must merely fulfill the function of supplying a square wave voltage, the frequency and phase of which is in a given fixed relationship to the rotation of the drum.

FIG. 6 showns another embodiment of the device in accordance with the present invention. The rotating magnetic drum 1 is supported in a housing 51 which is rigidly connected with the apparatus bottom 50. Coaxial to the drum 1, there is supported on the housing 51 the axially displaceable cylinder 5 which bears the magnetic head 4. This magnetic head is, therefore, not rotatable around the axis of the drum 1 in the embodiment shown here.

The servo motor 7 via the gearing 8 drives a shaft 52 which is connected with a cylindrical cage 53. In the cage 53, there is supported the photoelectric pickup device 54 which corresponds to the pickup device 14 of FIG. 1.

Figure 7C:
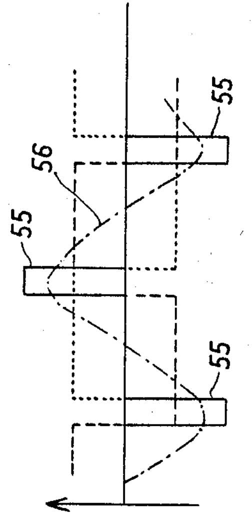
Figure 7A:
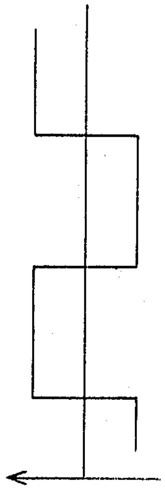

The operation of the device shown in FIG. 6 is as follows:

To store an information signal, the servo motor 7 rotates the cage 53 thereby to shift the timing signal with respect to the rotation of the drum. Thus, the reference point on the drum is rotated with respect to the fixed head 4. The photoelectric sensor generates a square wave as, for example, illustrated in FIG. 7*a*, which is applied to the modulator 16 to modulate the high frequency voltage derived by head 12. For recording, the modulated high frequency wave form is applied to the head 17 to record a carrier track over half the circumference of the drum 1.

Figure 7B:
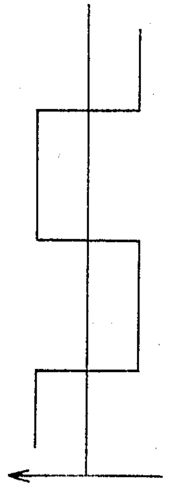

For reproduction the switches 15 and 17 are reversed. As the drum rotates, the head 4 will produce a square wave, which, after demodulation, is identical with the wave shown in FIG. 7*a*. Since the head is not movable with respect to the drum, and thus, reproduces the wave form stored on the drum both as to phase and frequency. However, the cage 53 may have rotated in the interval, and if so, the sensor 54 will produce a square wave as illustrated in FIG. 7*b*. Mixing of this square wave with the demodulated wave from the head 4 will produce an error signal consisting of the difference pulse 55. Again, a low pass filter will produce an error signal 56, the amplitude of which is related to the pulse width and the phase of which is related to the direction of error. This error signal may then be utilized to drive the servo motor 7 to rotate the cage 53 until it has assumed the same angular position with respect to the head as existed during recording.

It can, thus, be seen that, in the embodiment shown in FIG. 6, the circumferential distance between a reference point on the drum and the head position over the drum on recording is directly related to the amplitude of the stored signal. However, in the embodiment shown in FIG. 6, a selectable reference position is employed, whereas in FIGS. 1 and 2, the reference position is fixed on the drum and the head position is selectable.

FIG. 8 shows an arrangement which is built up with the use of the new apparatus. In this arrangement, the optical transmittance of T% of a specimen is being automatically measured as a function of the wave length $\lambda$ and recorded. This optical transmittance is to be referred to that of a reference substance, for example, water or air. The reference value, a quotient, then represents the value to be measured. For this purpose, the beam of a monochromator, the wave length $\lambda$ of which can be continuously varied is divided up into two measurement beams, one of these measurement beams passing through the specimen to be analyzed, while the other passes through the reference agent. Each beam accordingly falls on a separate receiver. Each receiver, thus, provides, after sufficient amplification, an output signal proportional to the corresponding measurement signal. In order to obtain as measurement value the optical transmittance of the specimen with respect to that of the reference agent, it is necessary to form the quotient from the two steady voltages appearing at the amplifier outputs. If neither specimen or reference substance is inserted in the two measurement beam paths, this quotient must always be equal to 1 independently of the wave length $\lambda$.

However, a technical physically established, fundamental defect of all such photometer is that this quotient is never exactly equal to 1 as a function of $\lambda$. Therefore, it is necessary to determine the correction factor $F_K$ dependent on $\lambda$ in order to bring this quotient at all times precisely to 1. It is furthermore known that this correction factor $F_K$ is also not constant over long periods of time, so that it must be remeasured periodically for operation of the apparatus over long time intervals. The two values $\lambda$ and $F_K$ represent here the measurement values, $\lambda$ being the independent one and $F_K$ the dependent one.

In the circuit shown in FIG. 8, $U_V$ is the voltage in the comparison beam path and $U_M$ the voltage in the measurement beam path. The reference voltage $U_V$ is present on the recording potentiometer 30, the wiper 31 of which is driven by the recording servo motor 32. The wiper 31 is at the same time connected mechanically with a stylus 33 which records on a rotating drum 34 the function determined. An electric motor 37 serves to rotate the drum 34. This motor can possibly serve via a gearing 38 also to turn the magnetic drum of the storage designated 39. The storage designated 39 corresponds to the device shown in FIGS. 1, 2 or 6, with the only difference that the electric motor designated 2 therein has been replaced by the motor 37 and the gearing 38.

The steady voltage $U_M$ obtained in the measurement beam path is present on the compensation potentiometer 35, the wiper 36, of which is driven by the servo motor 7 of the storage 39.

40 is a servo amplifier which can be connected optionally by means of the switch 41 to one of the two servo motors 32 or 7.

The manner of operation of the arrangement shown in FIG. 8 is as follows:

Initially, the switch 43 is brought into the position shown in dotted line. The switch 41 is in this connection in the position shown in the drawing. The tap 42 on the potentiometer 30 is now shifted until the servo motor 32 brings the stylus 33 precisely to the 100% line of the recording paper. Thereupon, as long as no specimen is present either in the comparison or the measurement beam path, the switches 41, 43 and 44 are brought into the position shown in dotted line. The servo motor 7 now displaces the tap 36 on the potentiometer 35 until the voltage supplied by the amplifier 40 has become zero. The position of the tap 36 then corresponds to the correction factor $F_K$ already discussed further above.

By means of the servo motor 7, the storage device 39 is simultaneously adjusted so that, therefore, the correction factor $F_K$ is stored.

Since, as already mentioned, the correction factor $F_K$ is a function of the wave length λ, the wave length is continuously adjusted on the monochromator by the adjusting process described. At the same time, the magnetic head 4 of the storage mechanism is displaced in axial direction via the rod designated 9 in FIG. 1. In this way, the function $F_K=f(\lambda)$ is finally stored by the storage mechanism 39.

Upon the actual measurement, the specimens are introduced into the comparison and measurement ray paths and the switches 41, 43 and 44 are brought into the positions shown in solid line. Thereupon, the tap 36 on the potentiometer 35 is now shifted via the storage device 39 as a function of the wave length λ at all times in connection with the correction function $F_K$. At the same time the servo motor 32 displaces the tap 31 on the potentiometer 30 until the voltage supplied by the servo amplifier 40 disappears. The measurement value recorded on the drum 34 corresponds in this connection to the optical transmittance of the liquid to be analyzed as referred to the transmittance of the reference substance.

In the arrangement shown in FIG. 8, a potentiometer 35 is connected directly to the servo motor 7. In most cases, it is advantageous to select a similar arrangement, since a potentiometer connected with the servo motor in such a case upon the reproduction always establishes a value corresponding to the measured value stored.

The arrangement shown in FIG. 8 is intended merely as an illustration. The storage mechanism shown in FIGS. 1 to 3 and 6 can be used advantageously also in a large number of applications.

This invention may be variously modified and embodied within the scope of the subjoined claims.

What is claimed is:

1. In combination, a magnetic drum, means for rotating said drum, a recording head, means for generating a timing signal, the frequency of which is responsive to drum rotation, and the phase of which is keyed to a reference point on the drum, servo means responsive to the amplitude of an information signal to adjust the angular position between said reference position and said head, means for applying said timing signal to said head, and means for comparing the timing signal and the signal read out by said head to reset the angular position between said head and said reference point so as to be identical on readout as upon recording.

2. The combination according to claim 1 in which said timing signal is keyed to a predetermined position on said drum and in which said head is rotatably driven by said servo to provide the desired angular position therebetween.

3. The combination according to claim 1 in which said head is fixedly positioned in a predetermined relationship to said drum and in which the phase of said timing signal is keyed to a selectable reference point on the drum.

4. The combination in accordance with claim 2 which includes a timing disk coupled to said drum, a sensor scanning said disk to provide a square wave output on drum rotation, a source of high frequency voltage, and modulation means to modulate said high frequency voltage by said square wave and which includes a demodulator to demodulate the output of said head on readout, a mixer to compare said demodulated signal with said square wave and to generate an error signal, and means to move said head until no error signal exists.

5. The combination in accordance with claim 3 which includes a timing disk coupled to said drum, a sensor scanning said disk to provide a square wave output on drum rotation, said sensor being rotatable with respect to said disk, a source of high frequency voltage, and modulation means to modulate said high frequency voltage by said square wave and which includes a demodulator to demodulate the output of said head on readout, a mixer to compare said demodulated signal with said square wave and to generate an error signal, means to rotate said sensor with respect to said disk until no error signal exists.

6. Apparatus according to claim 1 in which the magnetic head is movable in the direction of the axis of the drum for the recording of function values.

7. Apparatus according to claim 1 which includes a plurality of magnetic heads arranged on a common carrier and means for selecting, both upon the storage and upon the reproduction, one of said magnetic heads for a measured value.

8. Apparatus according to claim 4 in which the disk connected with the shaft of the magnetic drum is provided with a signal over half of its periphery.

9. The method of storing and reading out information using a rotating magnetic drum and a recording head positioned adjacent thereto, which comprises generating a timing signal synchronously related to drum rotation, the phase of said timing signal being related to a reference point on the surface of said drum, adjusting the angular position between said reference point on the drum and said recording head in response to the amplitude of the information signal and applying said timing signal to said head for recording said timing signal on the drum surface, and on readout generating a voltage which is proportional to the difference in phase between said timing signal generated during each drum rotation and the readout of said stored signal and adjusting the angular position between said reference point on said drum and said recording head until said phase-difference-signal disappears whereby said angular position is the same as during the recording process.

10. The method in accordance with claim 9 in which the timing signal is keyed to a predetermined reference point on said drum and in which said recording head is rotated about said drum in accordance with the amplitude of said stored signal.

11. The method in accordance with claim 9 in which the recording head is fixed with respect to said drum and in which said timing signal is keyed to a reference point which is selectable on said drum.

References Cited by the Examiner

UNITED STATES PATENTS 3,212,076 10/1965 Guerth ______________ 346—74

TERRELL W. FEARS, *Acting Primary Examiner.*

BERNARD KONICK, *Examiner.*

A. NEUSTADT, *Assistant Examiners.*